Feb. 3, 1942.    W. G. WATKINS    2,271,785
VALVE
Filed May 13, 1940
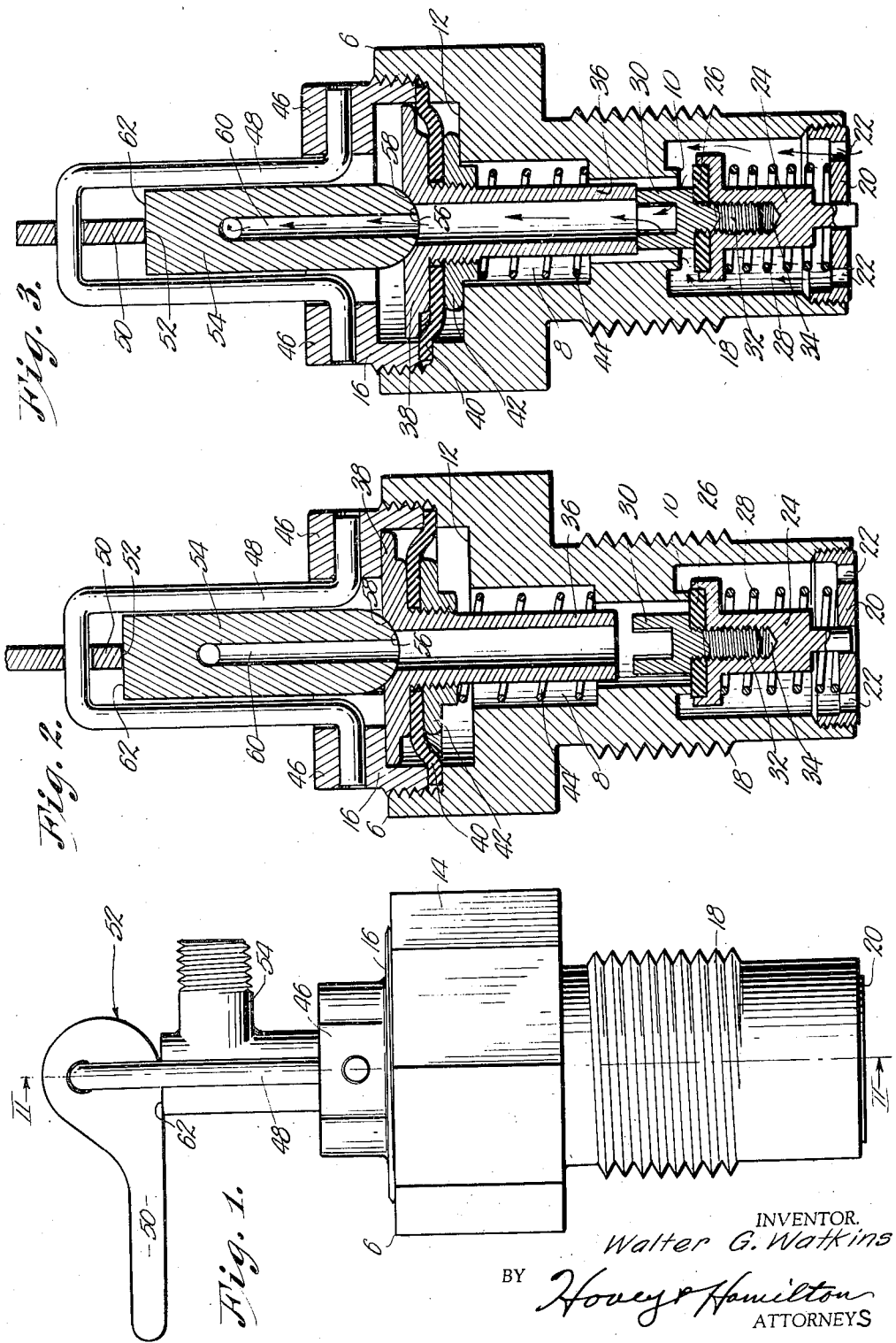
INVENTOR.
Walter G. Watkins
BY Hovey & Hamilton
ATTORNEYS Patented Feb. 3, 1942

2,271,785

UNITED STATES PATENT OFFICE 2,271,785

VALVE

Walter G. Watkins, North Kansas City, Mo.

Application May 13, 1940, Serial No. 334,777

6 Claims. (Cl. 284—17)

This invention relates to valves employed in liquefied gas systems at the point of discharge of the gas from a tank, which is usually portable, and the primary object is to provide a combination coupling and valve for the tanks of liquefied gas systems, which serves to quickly establish a connection between the tank and other parts of the system and to protect the contents of the tank during transportation in the event the portion of the valve projecting beyond the tank is broken.

One of the important aims of the instant invention is the provision of a valve for liquefied gas system tanks, the parts of which may be moved to the connected position without the employment of tools or wrenches, and which parts may be used at the plant in quickly recharging the tank without removal of the valve or any part thereof.

This invention has for another aim, the provision of a valve wherein is provided a diaphragm assembly, the movement of which permits the opening and closing of the passage through the valve body so that the parts of the valve may be disposed in the operative position with a minimum amount of work and without special tools or the manipulation of screw-threaded fittings.

An even further object of this invention is to provide a valve for the tanks of liquefied gas systems, the nature of which valve permits the filling of the tank without manually opening the passage through the body of the valve and through the utilization of the pressure of the gas.

Other objects of the invention including specific structural details will appear during the course of the following specification, referring to the accompanying drawing wherein:

Figure 1 is a side elevational view of a valve constructed in accordance with the present invention.

Fig. 2 is a longitudinal central sectional view through the valve taken on line II—II of Fig. 1, showing the main valve member in the seated position; and Fig. 3 is a similar sectional view illustrating the valve member in the unseated position as the valve would appear in an open liquefied gas system.

This invention is embodied in valves particularly useful in controlling the flow of gas from portable tanks, not here shown.

The valve body 6 has a passage 8 formed therethrough, a seat 10 created thereon within the passage near one end of body 6, and a shoulder 12 circumscribing passage 8 near the opposite end of body 6.

A wrench engaging portion 14 on body 6 has bonnet 16 in screw-threaded engagement therewith, and a cylindrical screw-threaded portion 18 depending from one side thereof. This cylindrical portion 18 is secured to the tank in the conventional fashion so that the free end of portion 18 is housed in a protected manner within the tank.

A plug 20 having perforations 22 therein is fitted into the free end of cylindrical portion 18, and a valve member 24 having a face of resilient material 26 is held in place by plug 20 so that spring 28 yieldably maintains valve member 24 in the seated position illustrated in Fig. 2.

Notched extension 30 has a screw-threaded neck 32 thereon that enters socket 34 in valve member 24 so as to removably hold the resilient material 26 in place. Above extension 30 and in longitudinal alignment therewith is disposed a hollow stem 36, on one end of which is formed a head 38.

A diaphragm 40 of flexible material, circumscribes hollow stem 36 and is held in position against the underside of head 38 by nut 42, which is in screw-threaded engagement with stem 36. A spring 44 yieldably maintains stem 36 at one end of its path of travel.

Hood 16 has integral bearings 46 thereon to journal the ends of yoke 48, the bight of which carries lever 50 having a cam face 52 thereon. A fitting 54 normally at the end of the tubing or pipe forming a part of the liquefied gas system, has one end thereof formed to present a convex face 56 which is complementary to concave face 58 formed on the upper end of stem 36.

A bore 60 provided in fitting 54 is in communication with the passage created in hollow stem 36 for the purpose, more fully hereinafter set down.

When the valve is in place on the liquefied gas system tank, the parts are disposed in the open position by swinging lever 50 about its axis of rotation on yoke 48.

Such movement will depress fitting 54 and move hollow stem 36 downwardly against notched extension 30. Spring 28 is then compressed and valve member 24 is unseated. Gas from the tank will move to the liquefied gas system in the direction of the arrows shown in Fig. 3.

When hollow stem 36 is moved as above mentioned, faces 56 and 58 are moved together against the tension of spring 44 to form a gas tight joint before fitting and stem 54 and 36 move downward. When cam lever 50 is employed a reasonably tight fit between nut 42 and shoulder 12 is established. If other means, such as a screw are used to force 54 and 36 downwardly, the fit between shoulder 12 and nut 42 may be much tighter, as well understood by those familiar with the art. Such engagement between 12 and 42 prevents undue pressure on diaphragm 40 and seals against the passage of gas.

When valve member 24 is opened as in Fig. 3, gas pressure under diaphragm 40 and associated parts further assists in establishing connection at surfaces 56 and 58.

When it is desired to close the valve, lever 50 is manually manipulated, valve member 24 is permitted to seat and then fitting 54 may be entirely removed from the position in bonnet 16, if desired. The head 38 on stem 36 will be in the position shown in Fig. 2, and diaphragm 40 will be moved from the condition illustrated in Fig. 3, to that shown in Fig. 2. Valve member 24 will again be set and the tank may be transported to a point where it is to be filled or otherwise used.

When filling the tank with which this valve is associated, it is only necessary to quickly insert another fitting such as 54 and thereafter force fluid through hollow stem 36 in a direction tending to unseat valve member 24. Spring 28 is relatively weak and the fluid pressure itself will serve to maintain valve member 24 in an unseated position so that the tank may be quickly filled.

Notched extension 30 serves as a guide to prevent accidental displacement of valve member 24. If diaphragm 40 should accidentally become leaky, the connection between nut 42 and shoulder 12 is tight enough to prevent the loss of an appreciable amount of the fluid.

Lever 50 has cam face 52 of special nature, formed thereon. Flat portion 62 snaps against the planar outer end of fitting 54 so as to lock lever 50 against accidental movement. Such arrangement insures against accidentally leaving the connection between 36 and 54 in a leaky condition for the lever will jump to a fully released position under the influence of spring 44 unless locked in place as in Fig. 1.

A valve made in accordance with the preferred embodiment of the invention is easily assembled and any part that must be replaced may be quickly renewed without mutilating the remaining parts of the valve assembly.

Having thus described the invention, what is claimed as new and desired to be secured by Letters Patent is:

1. A valve of the character described comprising a body provided with a passage therethrough and a seat in said passage; a valve member yieldably maintained against the seat; a hollow stem mounted within the passage for movement toward and from the valve member; a diaphragm circumscribing the stem with its outer periphery secured to the body to establish a transverse partition in the passage; a fitting provided with a bore in communication with the hollow stem; and manually operable means for moving the said valve member, the hollow stem and said fitting in one direction along the passage to move the said valve member from the seat whereby the fitting will form a leak-tight connection with the hollow stem before the latter moves against the said valve member.

2. A valve of the character described comprising a body provided with a passage therethrough and a seat in said passage; a valve member yieldably maintained against the seat; a hollow stem mounted within the passage for movement toward and from the valve member; a diaphragm circumscribing the stem with its outer periphery secured to the body to establish a transverse partition in the passage; a fitting provided with a bore in communication with the hollow stem; and manually operable means for moving the said valve member, the hollow stem and said fitting in one direction along the passage to move the said valve member from the seat, said fitting and said stem having cooperating faces in abutting relation at their zone of juncture to create a gas-tight joint, said gas-tight joint being formed before the stem moves against the said valve member.

3. A valve of the character described comprising a body provided with a passage therethrough; a seat on the body near one end of and circumscribing the passage; a shoulder on the body near the other end of and circumscribing the passage; a valve member yieldably maintained against the seat to close the passage; a hollow stem having a head thereon mounted within the passage for movement toward the valve member when the latter is seated; a flexible diaphragm circumscribing the stem with its outer periphery secured to the body to establish a transverse partition in the passage; a fitting provided with a bore in communication with the hollow stem; and manually operable means for moving the said valve member, the hollow stem and said fitting in one direction along the passage to unseat the valve member, said head having a portion thereof against the shoulder to limit the movement of the hollow stem in said one direction and to cooperate with the diaphragm in closing the passage to the passage of fluid therethrough, said fitting forming a leak-tight connection with the hollow stem before the stem moves against the valve member.

4. A valve of the character described comprising a body provided with a passage therethrough; a seat on the body near one end of and circumscribing the passage; a shoulder on the body near the other end of and circumscribing the passage; a valve member having a notched extension thereon yieldably maintained against the seat to close the passage; a hollow stem having a head thereon mounted within the passage for movement toward the extension on the valve member when the latter is seated; a flexible diaphragm circumscribing the stem with its outer periphery secured to the body to establish a transverse partition in the passage; a fitting provided with a bore in communication with the hollow stem; means on the body to move the fitting inwardly against the hollow stem; and a stop to limit the inward movement of the stem, said fitting and said hollow stem having complementary faces in abutting relation movable into tight engagement by the said means before the hollow stem has engaged the stop and before the stem is moved against the valve member.

5. A valve of the character described comprising a body provided with a passage therethrough and a seat in said passage; a valve member yieldably maintained against the seat; a hollow stem mounted within the passage for movment toward and from the valve member; a diaphragm circumscribing the stem with its outer periphery secured to the body to establish a transverse partition in the passage; a fitting provided with a bore in communication with the hollow stem; and manually operable means for moving the said valve member, the hollow stem and said fitting on one direction along the passage a predetermined fixed distance, to move the said valve member from the seat whereby said fitting will form a leak-tight connection with the hollow stem before the said stem moves against the said valve member.

6. A valve of the character described comprising a body provided with a passage therethrough and a seat in said passage; a valve member yieldably maintained against the seat; a hollow stem mounted within the passage for movement toward and from the valve member; a diaphragm circumscribing the stem with its outer periphery secured to the body to establish a transverse partition in the passage; a fitting provided with a bore in communication with the hollow stem; and means mounted on the valve for moving the fitting into the body passage a predetermined fixed distance against the hollow stem whereby to form and break a gas-tight connection between the fitting and the stem before and after the valve is opened and closed respectively.

WALTER G. WATKINS.